United States Patent [19]

Rocholl et al.

[11] Patent Number: 4,785,717
[45] Date of Patent: Nov. 22, 1988

[54] BRAKE ACTUATION UNIT WITH SLACK ADJUSTMENT

[75] Inventors: Hans Rocholl; Horst Klein, both of Remscheid, Fed. Rep. of Germany

[73] Assignee: Bergische Stahl-Industrie, Fed. Rep. of Germany

[21] Appl. No.: 67,447

[22] Filed: Jun. 26, 1987

[30] Foreign Application Priority Data

Jun. 27, 1986 [DE] Fed. Rep. of Germany ....... 3621639

[51] Int. Cl.$^4$ .............................................. F01B 31/00
[52] U.S. Cl. .......................................... 92/29; 92/31; 92/129; 92/130 R
[58] Field of Search ................. 92/31, 33, 129, 130 R, 92/130 D, 17, 29, 130 A

[56] References Cited

U.S. PATENT DOCUMENTS

| | | | |
|---|---|---|---|
| 4,088,205 | 5/1978 | Frania et al. | 92/31 X |
| 4,385,548 | 5/1983 | Persson et al. | 92/129 X |
| 4,493,246 | 1/1985 | Dalibout | 92/129 X |

FOREIGN PATENT DOCUMENTS

| | | | |
|---|---|---|---|
| 1274616 | 8/1968 | Fed. Rep. of Germany | 92/130 R |
| 2428645 | 1/1976 | Fed. Rep. of Germany | 92/130 D |
| 2806229 | 3/1979 | Fed. Rep. of Germany | 92/130 R |
| 939242 | 11/1948 | France | 92/31 |

*Primary Examiner*—Robert E. Garrett
*Assistant Examiner*—Mark A. Williamson
*Attorney, Agent, or Firm*—McGlew and Tuttle

[57] ABSTRACT

A brake actuation unit comprises a fluid pressure cylinder with a piston movable in the cylinder which has a central projection portion with a recess having axially spaced opposed coupling surfaces. The spindle is centrally arranged in respect to the piston and a nut is threadable on the spindle and has a tubular portion terminating in a flange which has a flange projecting portion extending into the recess of the piston projection portion and it has opposed coupling surfaces engageable with respective opposed coupling surfaces of the piston projecting portion so as to form respective axially opposite direction of movement coupling pairs. The guide sleeve is positioned over in spaced relationship to the nut tubular portion and has a radially extending collar on an end thereof adjacent the piston. An output head is movable in an axial direction to apply a braking force and has a tubular portion telescopically engaged over the guide sleeve. An actuation compression spring is disposed between the collar and the output head. A stop projects outwardly from the tubular portion of the nut beyond the piston side end of the guide sleeve and is easily turnable thereon. At least two opposed abutments are disposed in the cylinder on respective opposite sides of the stop and parallel to the direction of the braking and these projections are advantageously biased in respective opposite directions in respect to the direction of braking force.

7 Claims, 1 Drawing Sheet

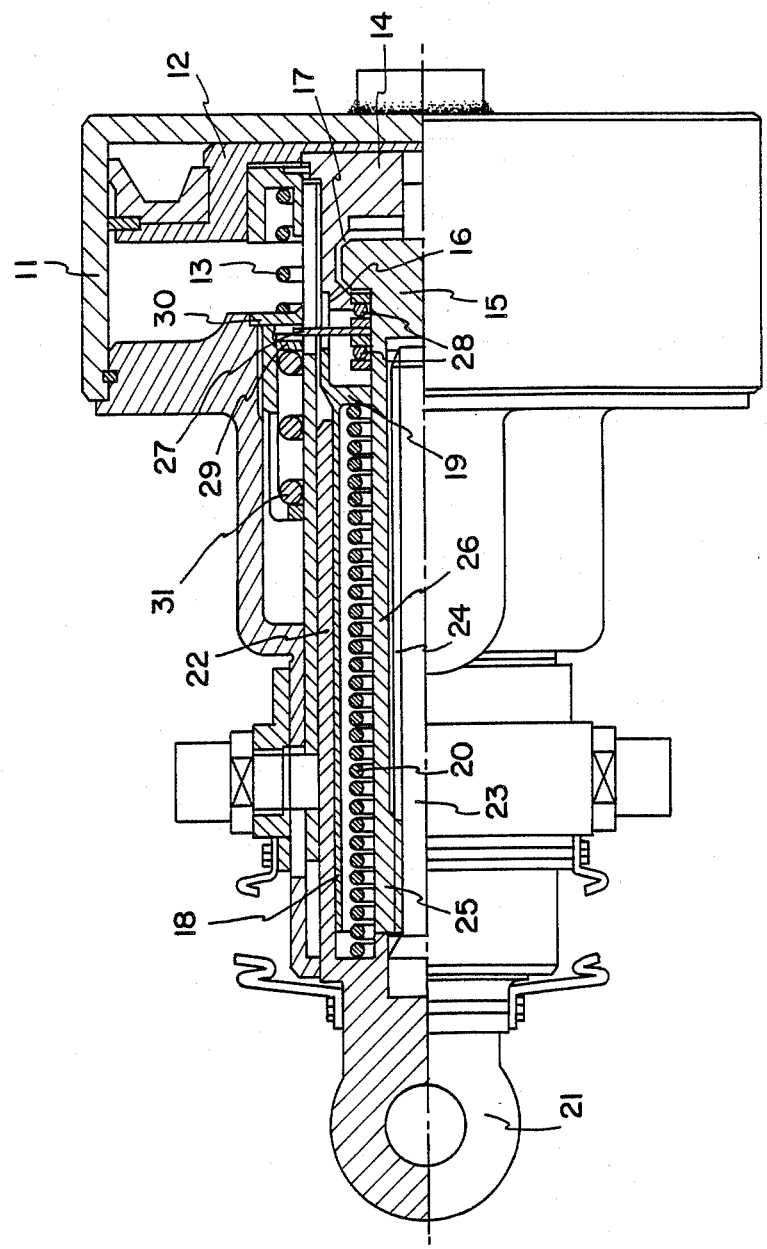

BRAKE ACTUATION UNIT WITH SLACK ADJUSTMENT

BACKGROUND OF THE INVENTION

Field of the Invention

This invention relates, in general, to braking devices and, in particular, to a new and useful fluid pressure operated braking device having a linkage setter and, in particular is useful for rail vehicles.

The invention relates to a brake actuation unit with a hydraulic or pneumatic cylinder, in particular for rail vehicles, having an installed single-action linkage setter for maintaining a clearance between the brake surfaces. A linkage setter, containing two telescopic parts, of which one part is formed as a threaded spindle and the other as a tubular part, is firmly connected with a nut which is screwed on the spindle with a non-selflocking thread. The tubular part carrying the nut has coupling surfaces which cooperate with coupling surfaces on the piston. A tensioned actuating spring is disposed between the piston and an output head.

Such a device is known, for example, from German Pat. No. 2,201,082 which, however, has the disadvantage that the resetting of the device after complete compensation of play for the installation of new, as yet unworn brake linings is expensive and complicated. Another disadvantage of this known device is that even when the actual clearance between the abutting friction surfaces (of the brake shoe as well as the brake surface on the brake disks) is smaller than the desired clearance, readjustment occurs until the desired clearance exists. This is especially disadvantageous if ice has formed on the friction surfaces, because then the clearance is increased beyond the acceptable amount. The device according to German Pat. No. 2,830,361 is based on a similar principle for adjustment in the case of worn brake linings, but in this case also complicated measures are necessary in order to bring the device to the initial position again for new brake linings, from which readjustment is then possible again if the wear of the brake lining results in too great a clearance.

SUMMARY OF THE INVENTION

The present invention avoids the disadvantages of the known devices and above all provides a brake actuation which, without any great expense and with simple means, can be reset again.

In accordance with the invention, there is provided on the tubular part, or on the projection thereof carrying the coupling surfaces of the coupling pairs, a stop fixed in axial directions but easily turnable relative to the tubular part. The tubular part extends in approximately a radial direction between two abutments, and the abutments are arranged fixed at least parallel to the direction of brake force.

Advantageously, at least one abutment is resilient.

Appropriately, there is provided between the actuating spring and the outer tube a sleeve applying against the inside of this tube, which sleeve is fastened to a non-adjusting part, possibly by way of intermediate elements.

An advantage of this device according to the invention is that, without any special tools, the resetting of the linkage setter can be achieved after the installation of new brake linings simply by pressing the brake shoe or the pressure element of the actuation unit connected therewith, backwardly, using a lever.

Accordingly, it is an object of the invention to provide a brake actuation unit with a hydraulic or pneumatic cylinder for rail vehicles which has an installed single action linkage setter for maintaining a clearance between the brake surfaces, with the linkage setter containing two telescoping parts, one of which is formed as a threaded spindle and the other is firmly connected with a nut which is screwed on the spindle with a non-selflocking thread.

A further object of the invention is to provide a brake actuation unit which is simple in design, rugged in construction and economical to manufacture.

BRIEF DESCRIPTION OF THE DRAWINGS

In the Drawings:

The only FIGURE of the drawings is a partial axial sectional and partial elevational view of a brake actuation unit constructed in accordance with the invention.

GENERAL DESCRIPTION OF THE PREFERRED EMBODIMENT

Referring to the drawing, in particular, the invention embodied therein comprises a brake actuation unit including a fluid pressure cylinder 11 which is useable, particularly for rail vehicles which have an installed single-action linkage setter for maintaining a clearance between the brake surfaces. In accordance with the invention, the linkage setter contains two telescopic parts, one of which comprises a threaded spindle 23 and the other comprises a nut 25 having a tubular part 26. The tubular part 26 has a flange or projection 15 with a portion which extends into a recess of a projection of the piston 12 arranged in the actuating cylinder 11. The portion of the flange 15 which extends into the recess defines coupling opposed axially spaced coupling surfaces which engage with respective opposite coupling surfaces in the recess of the projection 14 of the piston 12.

In accordance with a further feature of the invention, a stop 27 is mounted on the tubular portion 26 of the nut 25 and it is free to rotate in ball bearings 28. It is engageable with respective abutments 29 and 30 which are arranged in spaced relationship which is parallel to the direction of braking force.

The drawing illustrates an embodiment example of the invention in which the closed system is in the inoperative state. This system includes an actuating cylinder 11 for hydraulic or pneumatic actuation of the piston 12, which is loaded by the return spring 13. In a projection 14 of the piston 12 lies a flange 15 so that there form two opposite coupling pairs or surfaces 16 and 17, the spacing of the coupling surfaces in the projection 14 being greater than on the flange 15, whereby it is achieved that always only one coupling pair is coupled. The projection 14 of piston 12 is connected with a guide sleeve 18, which carries an inwardly pointing collar 19 as abutment for the actuating spring 20, which by its other end takes support on the output head 21, which is prolonged in the direction of piston 12 by a tubular part 22 in which the guide sleeve 18 is mounted, The output head 21 serves with the eye as connecting member to the brake lining or to the brake levers or the like. Bracing itself on the back of the output head 21, is the spindle 23, which extends almost up to the flange 15. Close to the output head 21, on the non-selflocking thread 24 of spindle 23, lies a nut 25 which by way of the tubular part 26 forms a unit with the flange 15. On the rear part of the tubular part 26, a stop 27 is mounted which is easily turnable between two ball bearings 28 but axially fixed. This stop 27 extends approximately radially outward between two abutments 29 and 30, with the return spring 13 of cylinder 11 bracing itself against the abutment 30, owing to which the abutment 30 is resiliently mounted in axial direction. Also, the other abutment 29 is resiliently held in its place by a spring 31. Each of the two abutments 29 and 30 is spaced at a small distance from the stop 27, the spacing between abutment 29 and stop 27 giving the adjustment amount, whereas the axial distance of stop 27 from abutment 30 is not critical.

The clearance between brake lining and friction surface, with the brake lining disposed directly or indirectly at the eye of the output head 21, is readjusted in known manner by displacing the piston 12 of cylinder 11, upon actuation of the piston, with the projection 14 to move it in the direction of the head 21. In so doing, the tensioned spring 20 moves the output head 21 away from the cylinder 11 and via the spindle 23 and nut 25 takes along the stop 27, the coupling pair of opposed surfaces 16 remaining closed. Now if no counter-pressure has resulted at the head 21 due to excessive clearance when stop 27 comes to abut on the abutment 29, the coupling pair 16 will open upon further actuation of cylinder 11, but the coupling pair 17 will not yet be closed. At the same time the actuating spring 20 pushes the output head 21 with the spindle 23 away from the cylinder 11, owing to which the nut 25 turns on spindle 23 and hence moves in the direction of the cylinder 11 until the coupling pair of surfaces 17 is closed. This process continues until, due to abutment of the brake linings on the brake surface, the output head 21 can no longer slide along the brake surface. Braking takes place.

Now if because the braking process is ended the pressure is taken out of the cylinder 11, piston 12 again moves into the initial position shown in the drawing, owing to which the coupling pair 17 is opened and coupling pair 16 is closed again and stop 27 is again located approximately in the middle between the two abutments 29 and 30. The correct clearance is now adjusted again.

Now if upon replacement of the worn brake linings the readjustment must be brought to the original state (as shown in the drawings), it suffices to push the output head 21 back in the direction of the cylinder 11, overcoming the force of the actuating spring 20 and using a bar or similar tool, until the coupling pair 16 is opened but the coupling pair 17 is not yet closed. This relative position of the couplings 16 and 17 is reached when stop 27 applies against the rear abutment 30. As soon as this is the case, through the pressure at the output head 21 the spindle 23 is displaced also, with the result that the nut 25 with the tubular part 26 and the flange 15 connected therewith turns counter to the adjusting rotation, doing so until the output head 21 abuts against the nut 25. If one now lets go of the head 21, the spindle 23 will be pushed by the actuating spring 20 away from the cylinder 11 until the coupling pair 17 is opened and the coupling pair 16 closed. Then the stop 27 is again approximately midway between the two abutments 29 and 30 and the actuation unit is ready for use again.

The stop 27 is approximately star-shaped, so that parts of the guide sleeve 18 can be brought up to the piston 12 or respectively to the projection 14 and can be fastened there.

While it is possible to mount the stop 27 in any known manner easily turnable on the tubular part 26, it has proved desirable to arrange this stop 27 axially fixed between two ball bearings 28 but turnable very easily. For the rest, the stop 27 may have any desired and suitable form, as for instance also using the bearings 28 themselves as stop.

By the arrangement of the sleeve 18 on the inner wall of the tubular part 22 and simultaneous attachment at the projection 14 of piston 12, this sleeve 18 functions as a guide for the relatively long actuating spring 20, so that the latter cannot buckle. For the sleeve 18 to be able to fulfill this function reliably, it must be fastened to a non-adjusting part.

It is possible also to provide the flange 15 with a shoulder corresponding to the tubular part 26 and directed opposite to the brake force, on which (part 26) the stop 27 is arranged easily turnable, and which extends between two abutments in analogous manner as the abutments 29 and 30.

While a specific embodiment of the invention has been shown and described in detail to illustrate the application of the principles of the invention, it will be understood that the invention may be embodied otherwise without departing from such principles.

What is claimed is:

1. A brake actuation unit comprising a fluid pressure operated cylinder and piston combination, particularly for rail vehicles for controlling an installed single action linkage setter for maintaining a clearance between the braking surfaces, said unit comprising two telescoping parts, one of said telescoping parts being formed as a threaded spindle and the other comprising a tubular part having a nut portion which is threaded to said spindle, said threaded connection comprising a non-selflocking thread, said nut tubular part having coupling surfaces spaced apart in the direction of braking and said piston having cooperating coupling surfaces which oppose said coupling surfaces of said nut disposed in the direction of braking, said unit including an output head, a tension-actuating spring arranged between said piston and said output head, said nut tubular part having a stop thereon fixed in an axial direction but easily turnable relative to said tubular part, said stop extending in a radial direction, said cylinder having two spaced abutments arranged on respective sides of said stop at least parallel to the direction of the brake force.

2. A brake actuation unit according to claim 1, wherein said stop comprises a star-shape member.

3. A brake actuation unit according to claim 1, wherein at least one abutment is formed so as to be resilient at least in the direction of actuation.

4. A brake actuating unit according to claim 1, wherein said tubular part is surrounded by an additional outer tube forming a unit with said tubular part and wherein said actuating spring lies between said tubes.

5. A brake actuating unit according to claim 1, including ball bearings arranged on each side of said stop.

6. A brake actuation unit according to claim 1, including a sleeve said sleeve is positioned between said actuating spring and the outer tubular part and applies against said spring, said sleeve being fastened to a non-adjusting part.

7. A brake actuation unit comprising a fluid pressure cylinder, a piston movable in said cylinder having a central projection portion with a recess having axially spaced opposed coupling surfaces, a spindle centrally arranged in respect to said piston, a nut threadably engaged on said spindle and having a tubular portion terminating in a flange having a flange projection portion extending into the recess of said piston, said projection portion having opposed coupling surface engageable with respective opposed coupling surfaces of said piston projection portion so as to form respective axially opposite in respect to the direction of braking movement coupling pairs, a guide sleeve positioned over and in spaced relationship to said nut tubular portion and having an inwardly extending collar on an end thereof adjacent said piston, an output head which is movable in an axial direction to apply a braking force and having a tubular portion telescopically engaged over said guide sleeve, an actuation compression spring disposed between said collar and said output head, a stop projecting outwardly from said tubular portion of said nut beyond the piston side end of said guide sleeve and easily turnable thereon, and at least two spaced abutments disposed in said cylinder on respective opposite sides of said stop directions parallel to the direction of the braking force.

* * * * *